US 012449915B2

(12) United States Patent
Lugo et al.

(10) Patent No.: US 12,449,915 B2
(45) Date of Patent: *Oct. 21, 2025

(54) SYSTEMS AND METHODS FOR PRODUCING RESPONSES TO INTERACTIONS WITHIN AN INTERACTIVE ENVIRONMENT

(71) Applicant: Universal City Studios LLC, Universal City, CA (US)

(72) Inventors: Victor Alexander Lugo, Belle Isle, FL (US); Kacey Eichen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,530

(22) Filed: May 24, 2024

(65) Prior Publication Data
US 2024/0310929 A1  Sep. 19, 2024

Related U.S. Application Data

(63) Continuation of application No. 18/127,552, filed on Mar. 28, 2023, now Pat. No. 11,995,249.
(Continued)

(51) Int. Cl.
G06F 3/0346 (2013.01)
A63F 13/219 (2014.01)
(Continued)

(52) U.S. Cl.
CPC .......... *G06F 3/0346* (2013.01); *A63F 13/219* (2014.09); *G06F 3/038* (2013.01); *H04B 1/7163* (2013.01); *A63F 13/837* (2014.09)

(58) Field of Classification Search
CPC .................................................. G06F 3/0346
See application file for complete search history.

(56) References Cited

U.S. PATENT DOCUMENTS 6,592,461 B1 * 7/2003 Raviv .................... A63F 13/10
463/37
7,854,656 B2 * 12/2010 Sato ....................... A63F 13/57
463/3
(Continued)

FOREIGN PATENT DOCUMENTS

CN      208145442 U     11/2018
WO   2016204617 A2     12/2016

OTHER PUBLICATIONS

Skyrak—The Ultimate Launch Monitor and Simulator, accessed 2023, 10 pages, https://www.skytrakgolf.com/.
(Continued)

*Primary Examiner* — Sepehr Azari
(74) *Attorney, Agent, or Firm* — Fletcher Yoder, P.C.

(57) ABSTRACT

An interactive system includes a portable device configured to be used in an interactive environment. The portable device includes an input mechanism that initiates delivery of a virtual projectile. The interactive system also includes a control system that includes one or more processors. The one or more processors receive data indicative of a location and an orientation of the portable device and receive additional data indicative of actuation of the input mechanism. In addition, the one or more processors determine a successful virtual interaction of an interactive physical element with the virtual projectile based on the location and the orientation of the portable device during the actuation of the input mechanism, and adjust an interactive virtual element displayed on a display screen in response to the successful virtual interaction of the interactive physical element.

20 Claims, 4 Drawing Sheets

Related U.S. Application Data

(60) Provisional application No. 63/325,412, filed on Mar. 30, 2022.

(51) Int. Cl.
  *A63F 13/837* (2014.01)
  *G06F 3/038* (2013.01)
  *H04B 1/7163* (2011.01)

(56) References Cited

U.S. PATENT DOCUMENTS

| | | | |
|---|---|---|---|
| 9,555,337 B2* | 1/2017 | Garlington | A63H 30/04 |
| 10,004,984 B2 | 6/2018 | Voris et al. | |
| 10,080,959 B2 | 9/2018 | Schumacher | |
| 10,366,571 B1* | 7/2019 | Wurmbrand | G07F 17/3286 |
| 10,409,363 B1* | 9/2019 | Kudirka | A63F 13/211 |
| 10,786,728 B2* | 9/2020 | Haas | A63F 13/25 |
| 10,818,152 B2 | 10/2020 | Yeh et al. | |
| 10,908,696 B2* | 2/2021 | Amihood | G06V 10/806 |
| 11,995,249 B2* | 5/2024 | Lugo | G06F 3/038 |
| 2003/0199323 A1* | 10/2003 | Wang | A63F 13/426 |
| | | | 463/51 |
| 2008/0248872 A1* | 10/2008 | Endo | A63F 13/285 |
| | | | 463/36 |
| 2009/0040194 A1* | 2/2009 | Shelton | G06F 3/03545 |
| | | | 345/179 |
| 2009/0209346 A1* | 8/2009 | Cheng | A63F 13/211 |
| | | | 463/37 |
| 2010/0013860 A1* | 1/2010 | Mandella | G06F 3/04815 |
| | | | 345/157 |
| 2010/0066736 A1* | 3/2010 | Nishimura | A63F 13/577 |
| | | | 345/419 |
| 2010/0203969 A1* | 8/2010 | Takahashi | G06F 3/038 |
| | | | 463/32 |
| 2010/0245232 A1* | 9/2010 | Birnbaum | A63F 13/92 |
| | | | 345/156 |
| 2011/0092289 A1* | 4/2011 | Dagman | A63F 13/211 |
| | | | 463/37 |
| 2011/0216060 A1* | 9/2011 | Weising | A63F 13/00 |
| | | | 345/419 |
| 2012/0249443 A1* | 10/2012 | Anderson | A63F 13/213 |
| | | | 345/173 |
| 2013/0265502 A1* | 10/2013 | Huebner | G06T 15/20 |
| | | | 348/789 |
| 2014/0324198 A1 | 10/2014 | Aubouy | |
| 2015/0170419 A1* | 6/2015 | Ohashi | G06F 3/011 |
| | | | 345/419 |
| 2015/0268717 A1* | 9/2015 | Schlumberger | G06F 3/011 |
| | | | 345/156 |
| 2016/0232715 A1* | 8/2016 | Lee | G06F 3/011 |
| 2017/0168556 A1* | 6/2017 | Goslin | G06F 3/011 |
| 2019/0217189 A1* | 7/2019 | Gutierrez | A63F 13/30 |
| 2020/0086208 A1* | 3/2020 | Chapman | H04N 23/90 |
| 2020/0098190 A1 | 3/2020 | Goergen et al. | |
| 2020/0114253 A1* | 4/2020 | Maruyama | A63F 13/54 |
| 2020/0202048 A1 | 6/2020 | Santarone et al. | |
| 2021/0038975 A1* | 2/2021 | Grillet | G06F 3/04815 |
| 2021/0197059 A1 | 7/2021 | Murdock et al. | |
| 2022/0023752 A1* | 1/2022 | Price | A63F 13/211 |
| 2022/0258039 A1* | 8/2022 | Bonneau | A63F 13/428 |
| 2022/0317782 A1* | 10/2022 | Yeh | A63F 13/235 |
| 2023/0315220 A1* | 10/2023 | Lugo | G06F 3/038 |
| | | | 345/158 |
| 2023/0408676 A1* | 12/2023 | Wang | G01S 13/765 |

OTHER PUBLICATIONS

Sports Entertainment Specialists, Full Swing Elite Sports Simulator—Indoor Virtual Sports, accessed 2023, 9 pages, https://www.sportsentertainmentspecialists.com/sports/multi-sport-simulator.
PCT/US2023/016807 International Search Report and Written Opinion mailed Jun. 13, 2023.

* cited by examiner

SYSTEMS AND METHODS FOR PRODUCING RESPONSES TO INTERACTIONS WITHIN AN INTERACTIVE ENVIRONMENT

CROSS-REFERENCE TO RELATED APPLICATION

This application is a continuation of U.S. Non-Provisional application Ser. No. 18/127,552, entitled "SYSTEMS AND METHODS FOR PRODUCING RESPONSES TO INTERACTIONS WITHIN AN INTERACTIVE ENVIRONMENT," filed Mar. 28, 2023, which claims priority to and the benefit of U.S. Provisional Application No. 63/325,412, entitled "SYSTEMS AND METHODS FOR PRODUCING RESPONSES TO INTERACTIONS WITHIN AN INTERACTIVE ENVIRONMENT," filed Mar. 30, 2022, which are hereby incorporated by reference in their entireties for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be noted that these statements are to be read in this light and not as admissions of prior art.

Amusement parks may include various entertainment attractions. Some entertainment attractions may provide an interactive environment for guests. For example, the guests may view an animated character on a display screen within the interactive environment, and the guests may provide inputs to control movement of the animated character on the display screen within the interactive environment.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, an interactive system includes a portable device configured to be used in an interactive environment. The portable device includes an input mechanism that initiates delivery of a virtual projectile. The interactive system also includes a control system that includes one or more processors. The one or more processors receive data indicative of a location and an orientation of the portable device, receive additional data indicative of actuation of the input mechanism, determine a successful virtual interaction of an interactive physical element with the virtual projectile based on the location and the orientation of the portable device during the actuation of the input mechanism, and adjust an interactive virtual element displayed on a display screen in response to the successful virtual interaction of the interactive physical element with the virtual projectile.

In an embodiment, an interactive system includes a portable device configured to be carried by a user as the user travels through an interactive environment. The portable device includes an input mechanism that initiates delivery of a virtual projectile. In addition, the interactive system includes a control system that includes one or more processors. The one or more processors receive data indicative of a location and an orientation of the portable device, receive additional data indicative of actuation of the input mechanism, and determine a successful virtual interaction of a first type of interactive element with the virtual projectile based on the location and the orientation of the portable device during the actuation of the input mechanism. In addition, the one or more processors adjust a second type of interactive element in response to the successful virtual interaction of the interactive physical element, with the virtual projectile wherein the first type of interactive element comprises an interactive physical element and the second type of interactive element comprises an interactive virtual element, or the first type of interactive element comprises the interactive virtual element and the second type of interactive element comprises the interactive physical element.

In an embodiment, a method includes receiving, based on a location and an orientation of a portable device during an actuation of an input mechanism, an indication of the actuation of the input mechanism on the portable device to launch a virtual projectile and determining a successful virtual interaction of a first type of interactive element with the virtual projectile. In addition, the method includes controlling, in response to the successful virtual interaction of the first type of interactive element with the virtual projectile, a second type of interactive element to produce a response, wherein the first type of interactive element comprises an interactive physical element and the second type of interactive element comprises an interactive virtual element, or the first type of interactive element comprises the interactive virtual element and the second type of interactive element comprises the interactive physical element.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
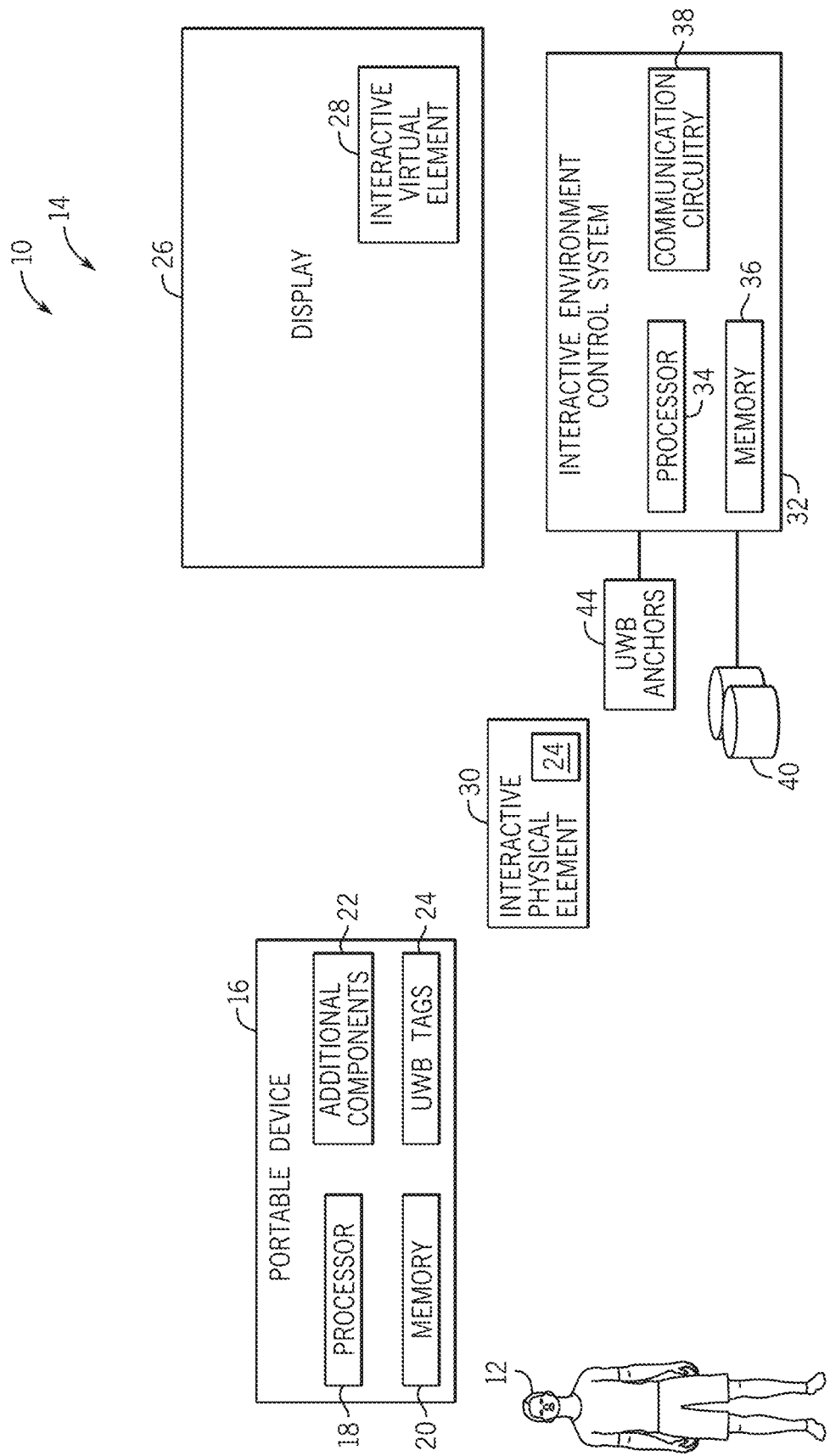
FIG. 1 is a schematic diagram of an interactive system, in accordance with present embodiments.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

The present disclosure relates generally to an interactive environment that utilizes portable devices to provide interactive experiences to guests (e.g., users). In an embodiment, the interactive environment is implemented within an amusement park attraction, such as in a ride attraction in which the guests are carried in ride vehicles through the interactive environment and/or a walk-through attraction in which the guests walk through the interactive environment. In an embodiment, the amusement park attraction may be a hybrid attraction in which the guests are both carried (e.g., on a moving walkway) and are permitted to walk (e.g., along the moving walkway) through the interactive environment. The interactive environment may be distributed across multiple different amusement park attractions (e.g., geographically separated from one another), such as across multiple different ride attractions, walk-through attractions, and/or hybrid attractions. Additionally or alternatively, the interactive environment may be included within one or more themed areas and/or distributed across multiple different themed areas having a common theme or different themes. Additionally or alternatively, the interactive environment may include a live show (e.g., with performers), and the guests in an audience may participate in the live show using their portable devices.

The portable devices may be any of a variety of types of devices that are configured to be carried, held, and/or worn by the guests. For example, the portable devices may include targeting devices (e.g., blasters), wands, toys, figurines, clothing, jewelry, bracelets, headgear, medallions, glasses, and/or any combination thereof (e.g., targeting devices integrated into bracelets). In an embodiment, the portable devices may be configured to be used by multiple different guests over time. For example, a guest may pick up a portable device at an entrance to the interactive environment, use the portable device to participate in the interactive environment as the guest travels through the interactive environment, and then return the portable device as the guest exits the interactive environment. The portable device may be made available again at the entrance to the interactive environment (e.g., after cleaning), and then another guest may pick up the portable device at the entrance to the interactive environment and use the portable device to participate in the interactive environment, and so on.

As discussed herein, the portable devices may enable the guests to interact with (e.g., to control) features within the interactive environment. For example, a portable device may be a targeting device, and the guest may actuate an input mechanism (e.g., trigger switch, push-button) of the portable device to initiate a simulation of a delivery (e.g., virtual delivery) of a virtual projectile toward an interactive element (e.g., a physical interactive element in a physical, real-world space or a virtual interactive element in a virtual space on a display screen) within the interactive environment. In response, the interactive environment may portray the virtual projectile landing on (e.g., "striking"; "hitting") the interactive element. For example, the display screen may display an image (e.g., moving image; video) that portrays the virtual projectile landing on (e.g., "striking"; "hitting") the interactive element. In another example, a change in the behavior of a physical interactive element or presence of special effects (e.g., sound, light, smoke, vibrations) in the interactive environment may indicate a successful targeting of the physical interactive element.

Generally, there may be two types of interactive elements: an interactive physical element, which is a prop or a physical object in the physical, real-world space within the interactive environment, and an interactive virtual element, which is an image/animation of a virtual object displayed in the virtual space on the display screen. Both interactive physical elements and interactive virtual elements may be dynamic interactive elements that move around and/or contain moving parts in the interactive environment/on the display screen. In addition, an interactive hybrid element may be an interactive physical element and an interactive virtual element simultaneously by having physical portions in the physical, real-world space within the interactive environment and virtual portions displayed in the virtual space on the display screen. Herein, "interactive element" generally refers to any interactive physical element, interactive virtual element, or interactive hybrid element.

FIG. 1 illustrates an interactive system 10 that facilitates interactions within an interactive environment 14, in accordance with an embodiment of the present disclosure. The interactive environment 14 may be within an amusement park attraction or other suitable location. As shown, a guest (e.g., user) 12 may carry or otherwise be associated with a portable device 16 that includes a processor 18, a memory device 20, and additional components 22. The additional components 22 may include an input mechanism (e.g., trigger switch, push-button), a light emitter (e.g., light emitting diode [LED]), a haptic device, a display screen, a battery (and battery management system), a speaker, a microphone, an inertial measurement unit, a near-field communication (NFC) circuitry, and/or an ultra-high frequency (UHF) circuitry. The portable device 16 may be used to target and/or interact with interactive elements (e.g., interactive virtual elements, interactive physical elements, and/or interactive hybrid elements).

Advantageously, the portable device 16 may be equipped with ultra-wideband (UWB) tags 24 that enable monitoring (e.g., continuous monitoring) of a position and/or an orientation of the portable device 16 (e.g., relative to a coordinate system; within the interactive environment 14). In addition, the UWB tags 24 are part of a UWB circuitry (e.g., a UWB system) that generates and efficiently communicates position data and/or orientation data, which may enable an interactive environment control system 32 to accurately determine successful virtual interaction (e.g., successful targeting) of the interactive elements with the portable device 16. It should be appreciated that any other suitable components may be utilized to detect the position and/or the orientation of the portable device 16 (e.g., one or more sensors, such as accelerometers, on the portable device 16, and communication circuitry to send data from the sensors to the interactive environment control system 32; one or more sensors, such as imaging sensors/cameras, off-board the portable device 16 and in the interactive environment 14). In an embodiment, no light emitters, lasers, or line-of-sight sensing devices are utilized to detect the position and/or the orientation of the portable devices 16.

The interactive environment 14 may include one or more display screens 26 that are configured to display interactive virtual elements 28. The interactive virtual elements 28 may include images (e.g., moving images; videos) of animated objects, such as symbols, coins/prizes, vehicles, and/or characters. The interactive virtual elements 28 may move in two dimensions (2D) in the virtual space on the display screen 26. In addition, the interactive environment 14 may include one or more interactive physical elements 30 that are placed or built into the interactive environment 14. The interactive physical elements 30 may include physical structures, props, vehicles, and/or robots. The interactive physical elements 30 may move in three dimensions (3D) in the physical, real-world space within the interactive environment 14.

As the guest 12 travels through the interactive environment 14, the guest 12 may be presented with the interactive elements. For example, images of animated objects may move across the display screen 26 and/or robots may move in the interactive environment 14. The guest 12 may use the portable device 16 to virtually interact with (e.g., target) the interactive elements, such as by actuating the input mechanism on the portable device 16 to launch virtual projectiles toward the interactive elements. Virtual projectiles may not have a physical embodiment or actual representation (e.g., virtual projectiles may not be seen or sensed; may not be present in the physical, real-world space and/or in the virtual space). However, in an embodiment, images of the virtual projectiles may be shown on the display screen 26. In addition, the interactive elements may respond to virtual interactions with virtual projectiles by producing a response (e.g., moving, stopping, disappearing, ducking, becoming agitated) to provide feedback about the trajectory of the virtual projectile to the guest 12.

In an embodiment, the interactive system 10 may award points (e.g., achievements) to the guest 12 for each successful "strike" at the interactive elements and the points may be added to a guest profile of the guest 12. In an embodiment, the interactive environment control system 32 (also referred to herein as "a control system 32") may track the successful targeting of interactive elements and update the guest profile for the guest 12 as the guest 12 travels through the interactive environment 14 (e.g., in real-time). The guest profiles and the associated award points may be stored in one or more databases 40 accessible by the interactive environment control system 32. In an embodiment, a processor 34 (e.g., the processor 34 of the control system 32) may transfer the award points and/or a final guest profile to the one or more databases 40 at a conclusion of the interactive experience for use in future interactive experiences. In this way, the guest profile of the guest 12 may be maintained and updated across multiple visits to the interactive environment 14.

The interactive environment control system 32 may be responsible for controlling interactive physical elements 30 and interactive virtual elements 28 to produce responses to virtual interactions (also referred to herein as "interactions") between virtual projectiles released by the portable devices 16 and the interactive elements in the interactive environment 14. For example, the control system 32 may move or otherwise change the interactive elements in response to the position data and/or the orientation data indicating that the portable device 16 is aimed at the interactive element prior to and/or during actuation of the input mechanism (e.g., the interactive element ducking and/or moving to evade targeting).

In addition, the control system 32 may be responsible for tracking the interactions between the physical objects (e.g., portable devices 16 and interactive physical elements 30) and the virtual objects (e.g., interactive virtual elements 28) in the interactive environment 14. As mentioned, this may involve calculating the trajectories of the virtual projectiles with an aim of determining whether the virtual projectile may reach or has reached a target (e.g., based on the position data and/or the orientation data during the actuation of the input mechanism, as well as respective locations of the interactive elements).

The control system 32 may include the processor 34, a memory device 36, and communication circuitry 38 to enable the control system 32 to control features within the interactive environment 14 (e.g., control the interactive elements and/or produce special effects in the interactive environment 14) and/or communicate with the portable device 16. The processor 34, the memory device 36, and the communication circuitry 38 may enable the control system 32 to control the movements of interactive physical elements 30 and the interactive virtual elements 28, track locations of the interactive physical elements 30 and the portable devices 16, access locations of the interactive virtual elements 28, and calculate/simulate trajectories of the virtual projectiles.

The memory device 36 may include one or more tangible, non-transitory, computer-readable media that store instructions executable by the processor 34 and/or store data (e.g., guest profile) to be processed by the processors 34. For example, the memory device 36 may include random access memory (RAM), read only memory (ROM), rewritable non-volatile memory such as flash memory, hard drives, optical discs, and/or the like. Additionally, the processor 34 may include one or more general purpose microprocessors, one or more application specific processors (ASICs), one or more field programmable gate arrays (FPGAs), or any combination thereof. Further, the memory device 36 may store instructions executable by the processor 34 to perform the methods and control actions described herein for the interactive system 10.

Tracking the virtual interactions (between the portable devices 16 and the interactive elements may involve mapping physical objects (e.g. the portable devices 16 and the interactive physical elements 30) that exist in the physical, real-world space onto the virtual space/interactive space. In an embodiment, the virtual space and the interactive space may be the same space. In this case, the interactive virtual elements 28, which exist in the virtual space, may not need to be mapped. In an embodiment, the virtual space may be distinct from the interactive space. In this case, the interactive virtual elements 28 the may be mapped from the virtual space to the interactive space.

Generally, the physical, real-world space refers to a 'space' where only interactions between the physical objects (e.g., the portable devices 16, the interactive physical elements 30) and guests 12 take place. That is, the physical, real-world space is where the guests 12 are physically present. The virtual space refers to a 'space' seen by the guests 12 on the display screen 26. The images on the display screen 26 may not appear two-dimensional (2D). Instead, images on the display screen 26 may appear as a three-dimensional (3D) extension of the interactive environment 14 (e.g., extension of and/or connected to the physical, real-world space). The interactive space is the 'space' where the dynamic interactions between the physical objects (e.g., the portable devices 16, the interactive physical elements 30) and the virtual objects (e.g., the virtual projectiles, the interactive virtual elements 28) takes place. For example, a virtual projectile may "hit" an interactive physical element 30 in the interactive space. In this way, the interactive space makes it possible for the guests 12 to interact and observe interactions across the physical, real-world space and the virtual space.

Generally, there are various ways of mapping physical/virtual objects to the interactive space. In an embodiment, mapping of the portable devices 16 and the interactive physical elements 30 from the physical, real-world space to the interactive space may involve tracking, via the UWB tags 24, the locations of the portable devices 16 and the interactive physical elements 30 in the physical space and translating the locations onto the interactive space. In an embodiment, mapping of the interactive physical elements 30 and the interactive virtual elements 28 from physical/virtual space onto the interactive space may involve accessing, via the processor 34 of the control system 32, pre-programmed locations/movements of the interactive physical elements 30 and the interactive virtual elements 28, and translating the pre-programmed locations/movements to the interactive space. In this embodiment, exact locations of interactive elements may be known without use of the UWB tags 24. In an embodiment, mapping of the portable devices 16 and interactive elements onto the interactive space may involve a combination of above embodiments (e.g., tracking the locations of the portable devices 16 and the interactive physical elements 30 using the UWB tags 24 and assessing pre-programmed locations/movements of the interactive physical elements 30 and the interactive virtual elements 28).

In an embodiment, the UWB tags 24 may be used to track the locations of the portable devices 16 and the interactive physical elements 30. In particular, the UWB tags 24 and UWB anchors 44, which are in communication with the control system 32, may be part of a real-time locating system that performs continuous location tracking (e.g., position and/or orientation tracking) within the interactive environment 14. For example, the UWB tags 24 on the portable devices 16 and the interactive physical elements 30 may communicate with the UWB anchors 44, which may be distributed throughout the interactive environment 14, to send positioning data. The UWB anchors 44 may then send the positioning data to the control system 32.

The data from the UWB tags 24 and the UWB anchors 44 may enable the processor 34 to perform trajectory mapping for the virtual projectiles (e.g., determine a trajectory, such as a virtual flight path) in the interactive space. The trajectory of the virtual projectiles may be used to represent a "hit" location and/or an angle of impact of the virtual projectiles in the interactive environment 14 (e.g., on the display screen 26) to provide a realistic experience to the guest 12. For example, when the guest 12 "fires" the virtual projectile toward an interactive physical element 30, it is not clear to the guest 12 that the virtual projectile reaches the interactive physical element 30 because the virtual projectile is invisible in the physical, real-world space. However, the trajectory of the virtual projectile can be calculated/simulated in the interactive space, and the mapped location of the interactive physical element 30 may be used to determine the possibility of impact. Thus, successful virtual interaction (e.g., targeting, aiming at, "hitting", "striking") of the interactive physical element 30 with the virtual projectile may be determined in the interactive space. The successful virtual interaction with the interactive physical element 30 may produce a response, which may be influenced by the trajectory of the virtual projectile. For example, after being "hit" by the virtual projectile, the interactive physical element 30 may collapse in the direction from which it was "hit."

In an embodiment, the additional components 22 of the portable device 16 may provide various types of feedback (e.g., special effects) to the guest 12 based on the interaction between the portable device 16 and interactive elements in the interactive environment 14. For example, the additional components 22 (e.g., light emitter, haptic device, display screen, speaker) may provide respective feedback upon the successful targeting of the interactive element and/or upon points being assigned to the guest profile. For example, the feedback provided by the additional components 22 may involve vibration/recoil when the virtual projectile is "fired." In another example, the feedback provided by the additional components 22 in response to the virtual projectile "hitting" an interactive virtual element 28 may include a sound of a bang emitted by the speaker(s). In an embodiment, additional device(s) (e.g., light emitter, haptic device, speaker, or a combination thereof) that provide feedback/special effects may be distributed throughout the physical, real-world space within the interactive environment 14.

Figure 2:
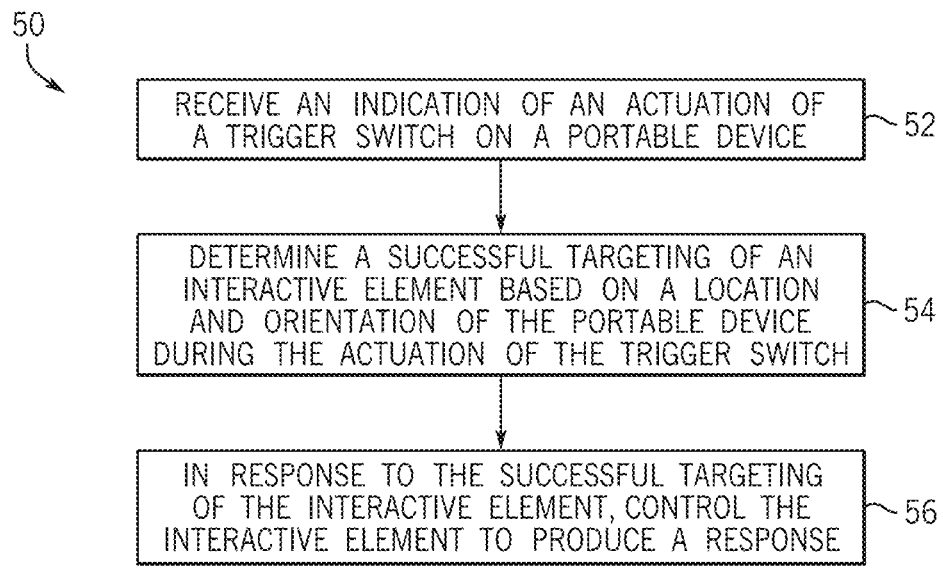
FIG. 2 is a flow diagram of a method of controlling an interactive element in response to successful targeting of the interactive element by a portable device, in accordance with present embodiments.

FIG. 2 is a flow diagram of a method 50 of controlling an interactive element in response to a successful targeting of the interactive element by a portable device, such as the portable device 16 of FIG. 1, in accordance with present embodiments. The method 50 includes various steps represented by blocks. It should be noted that at least some steps of the method 50 may be performed as an automated procedure by a system, such as the interactive system 10 of FIG. 1. Although the flow chart illustrates the steps in a certain sequence, it should be understood that the steps may be performed in any suitable order and certain steps may be carried out simultaneously, where appropriate. Additionally, steps may be added to or omitted from the method 50. Further, some of all of the steps of the method 50 may be performed by the processor 34 of the control system 32 of FIG. 1.

In block 52, the method 50 may include receiving an indication of an actuation of an input mechanism on the portable device 16. Actuation of the input mechanism may indicate "firing" of a virtual projectile by the portable device 16. The location and orientation of the portable device 16, which may be continuously monitored by the UWB circuitry (e.g., UWB tags 24 and UWB anchors 44) and/or other suitable components, may be recorded at the time of the actuation of the input mechanism/"firing" of the virtual projectile. The location and orientation of the portable device 16 may be sent to the control system 32 for calculation/simulation of the trajectory of the virtual projectile.

In block 54, the method 50 may include determining a successful targeting of an interactive element based on the location and orientation of the portable device 16 during the actuation of the input mechanism. Determining the successful targeting of the interactive element may involve mapping the portable device 16 and the targeted interactive element onto the interactive space. Then, physics may be applied to calculate the trajectory of the virtual projectile "fired" by the portable device 16. In an embodiment, it may not be clear which interactive element out of several interactive elements has been targeted. In this case, all interactive elements in the vicinity of the trajectory of the virtual projectile may be mapped onto the interactive space to determine a possibility of the successful targeting. In an embodiment, a threshold distance (e.g., distance measured between the virtual projectile and the target at their closest point in the interactive space) may be used to determine a successful targeting of the interactive element. For example, the virtual projectile has to come within at least one inch of the target to count as a "hit."

The virtual projectile may appear to be made up of different materials depending on the theme of the immersive experience/guest profile. For example, if the interactive environment 14 has a water/poolside theme, the portable device 16 may look like a water blaster and the virtual projectile may appear on the display screen 26 as a water squirt/stream. In this case, physics of water/fluids may be applied in the interactive space to calculate/simulate the trajectory of the aqueous virtual projectile.

In block 56, the method 50 may include controlling the interactive element to produce a response upon detection of a successful targeting of the interactive element. Controlling the interactive element to produce a response to the successful targeting may involve generating a signal at the control system 32 to change the targeted interactive element in a way that may be noticeable to the guest 12. For example, the interactive physical element 30 may stop, topple, jump, and/or shake in response to being "hit" by a virtual projectile. More examples of responses of interactive elements to successful targeting by virtual projectiles from the portable device 16 are illustrated in FIG. 3 and FIG. 4.

Figure 3:
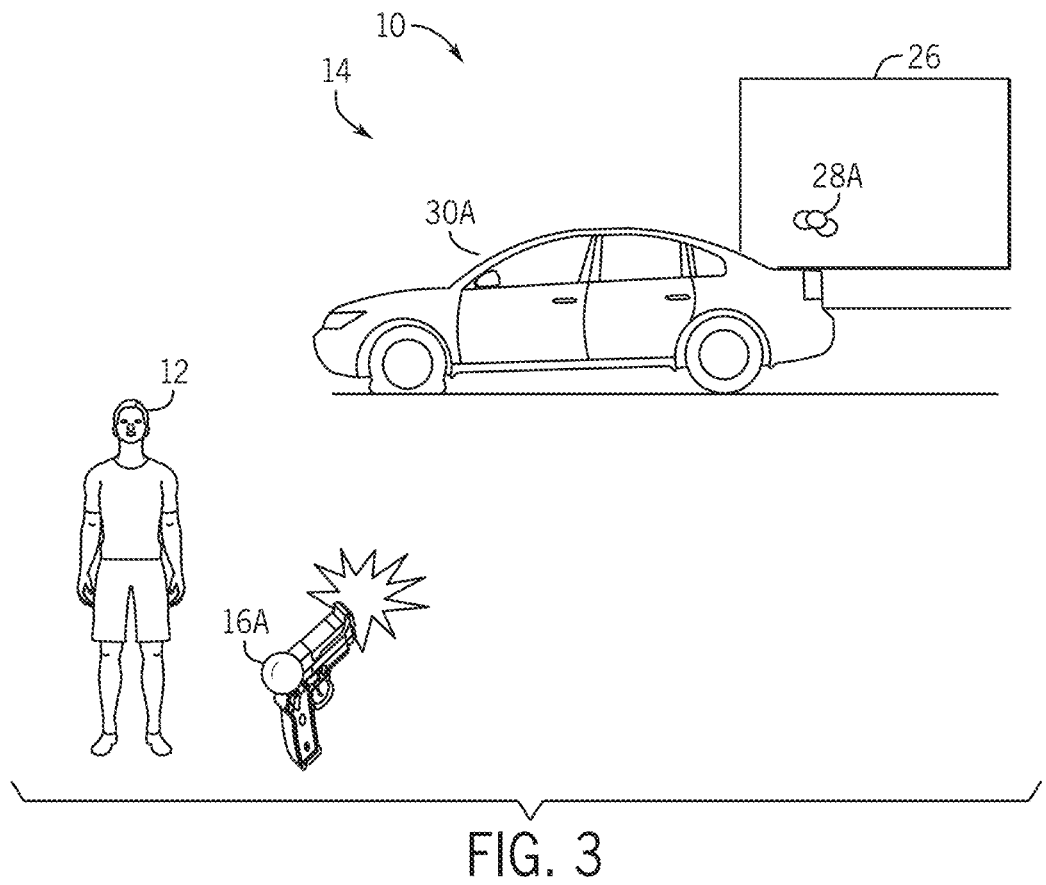
FIG. 3 is a schematic diagram of an interactive system where successful targeting of an interactive physical element produces a response via the interactive physical element and an interactive virtual element, in accordance with present embodiments.
Figure 4:
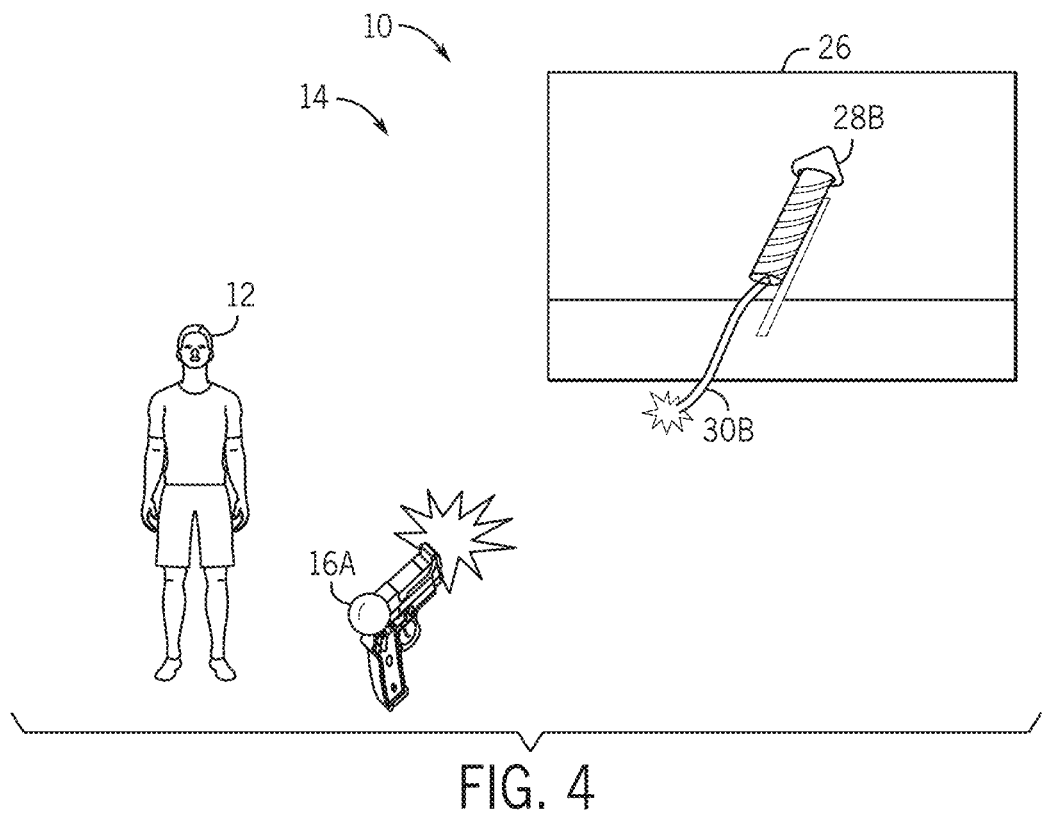
FIG. 4 is a schematic diagram of an interactive system where successful targeting of an interactive physical element that extends into a virtual space produces a response in the virtual space, in accordance with present embodiments.

FIG. 3 is schematic diagram of the interactive system 10 where a successful targeting of the interactive physical element 30 produces a response in the interactive physical element 30, in accordance with present embodiments. As illustrated, the interactive environment 14 includes the display screen 26, a vehicle 30A that is the interactive physical element 30, and a blaster 16A that is the portable device 16 held by the guest 12. "Firing" the virtual projectile may immediately (e.g., substantially immediately, such as within milliseconds) produce an effect, such as a flash, by the additional components, such as LEDs, on the blaster 16A. The effect may provide feedback to the guest 12 indicating that the blaster 16A has "fired".

The locations and orientations of the blaster 16A and the vehicle 30A at the time of the actuation of the input mechanism may be detected using the UWB circuitry (e.g., UWB tags 24 and UWB anchors 44) and recorded. In addition, continuous (e.g., real-time) monitoring using the UWB circuitry may indicate whether the vehicle 30A and/or the blaster 16A was moving at the time of the actuation of the trigger. If so, the velocity and/or acceleration of the vehicle 30A and/or the blaster 16A may be calculated. In an embodiment, the position (e.g., location coordinates), orientation, velocity, and/or acceleration of the vehicle 30A and blaster 16A may be used to simulate/calculate the trajectories of the virtual projectile and the vehicle 30A in the interactive space after the blaster 16A has been "fired." This simulation/calculation of the trajectories in the interactive space may be used to determine whether the vehicle 30A was "hit" by the virtual projectile from the blaster 16A.

The virtual projectile trajectory simulation may be precise enough to determine which part of the vehicle 30A has been "hit." For example, in the illustrated embodiment, a tire of the vehicle 30A has been "hit." In response (e.g., response to the determination that the tire of the vehicle 30A has being successfully targeted), the vehicle 30A may stop moving (e.g., due to the tire of the vehicle 30A deflating, tearing, or exploding, which may be represented via physical changes to the tire of the vehicle 30A; the tire of the vehicle 30A may appear damaged/exploded). In addition, pieces of the damaged/exploded tire 28A may be represented as interactive virtual elements 28 and shown on the display screen 26 to provide additional feedback to the guest 12 indicating successful targeting of the tire of the vehicle 30A. Stopping of the vehicle 30A and appearance of the pieces of the damaged/exploded tire 28A may be accompanied by sound effects emitted from the speaker(s) on the blaster 116A and/or throughout the interactive environment 14. For example, the sound effects may include the sound of the car rapidly coming to a stop and the sound of air escaping the tire. The sound effects may provide additional feedback to the guest 12 in response to the successful targeting of the vehicle 30A. In this way, the guest 12 may receive an immersive experience in which the interactive physical element 30 (e.g., the vehicle 30A), or portions thereof (e.g., the pieces of the damages/exploded tire 28A), is transferred to and/or extends into the virtual space (e.g., represented as the interactive virtual elements 28; move into the virtual space) in response to the successful targeting of the interactive physical element 30.

FIG. 4 is a schematic diagram of the interactive system 10 where the successful targeting of the interactive physical element 30 that has a virtual component produces a response in the virtual component, in accordance with present embodiments. As illustrated, the interactive environment 14 includes a fuse 30B that is the interactive physical element 30 and a firework body 28B that is the interactive virtual element 28 on the display screen 26. Taken together, the fuse 30B and the firework body 28B are a single interactive element (e.g. a firework) that has components in both the physical, real-world space and the virtual space. The fuse 30B appears to extend from the physical, real-world space into the virtual space, where it is "connected" to the firework body 28B. In practice, the firework body 28B is an image that appears on the display screen 26 and the fuse 30B may be a physical fuse that is adjacent/attached to the display screen 26. The interactive environment 14 also includes the blaster 16A that is the portable device 16 held by the guest 12.

Upon the actuation of an input mechanism on the blaster 16A, a virtual projectile is "fired". The virtual projectile may "hit" the fuse 30B, lighting it up (e.g., illuminating one or more light emitters positioned along the fuse 30B). Lighting of the fuse 30B may cause appearance of a spark to travel up the fuse 30B to the firework body 28B on the display screen 26. After the spark reaches the firework body 28B, images of the exploding firework may appear on the display screen 26 and/or the firework body 28B may disappear from the display screen 26. Thus, the successful targeting of a physical component (e.g., the fuse 30B) of a hybrid interactive element (e.g. an interactive element with a physical component and a virtual component), may produce a response and in the virtual component (e.g., the firework body 28B). In an embodiment, the opposite may be true where successful targeting of a virtual component of a hybrid interactive element may produce a response in a physical component of the hybrid interactive element. Furthermore, as described, the successful targeting of the physical component or the virtual component of the hybrid interactive element may produce a response in both the physical component and the virtual component of the hybrid interactive element (e.g., the fuse 30B illuminates and the firework body 28B explodes; the fuse 30B illuminates and then disappears, such as by being physically moved out of view of the guest 12, and the firework body 28B explodes).

In an embodiment, the interactive virtual element (e.g., the firework body 28B; the firework) that is related to the interactive physical element (e.g., the fuse 30B) may not be shown on the display screen 26 prior to the "hit" on the interactive physical element. Instead, the "hit" on the interactive physical element, which may appear to connect or extend into the virtual space at the display screen 26, may cause the interactive virtual element to appear on the display screen 26. In such cases, the interactive physical element and the interactive virtual element may not form the hybrid interactive element, but still appear to have some connection (e.g., the interactive physical element is proximate to and/or terminates at the display screen 26; the "hit" on one causes a change to the other). Generally, the interactive physical element and the interactive virtual element may be adjusted and/or provide effects in a coordinated (e.g., temporally and spatially coordinated) manner to provide various visual effects, such as visual effects of at least a portion of the interactive physical element transitioning into the virtual space shown on the display screen 26.

It may be appreciated that special effects emitted from the additional components located on the blaster 16A or distributed throughout the interactive environment 14 may provide feedback to the guest 12. For example, a jolt of the blaster 16A delivered by haptic technologies that may be part of the blaster 16A may indicate that the virtual projectile has been "fired". In addition, the explosion of the firework may be accompanied by a sound of exploding fireworks emitted by the speakers in the interactive environment 14.

Figure 5:
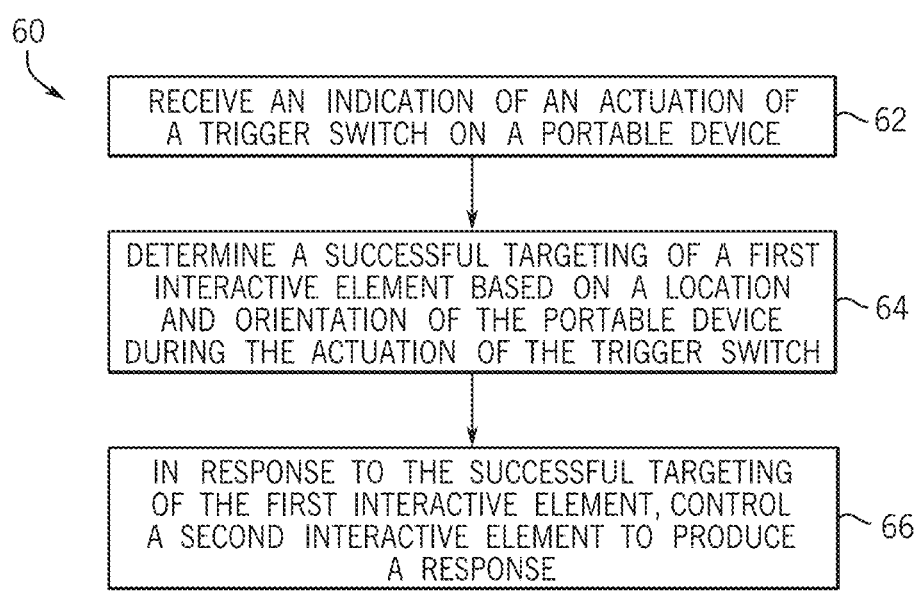
FIG. 5 is a flow diagram of a method of controlling a first interactive element in response to successful targeting of a second interactive element by a portable device, in accordance with present embodiments.

FIG. 5 is a flow diagram of a method 60 of controlling a second interactive element in response to a successful targeting of a first interactive element by a portable device, such as the portable device 16 of FIG. 1, in accordance with present embodiments. The method 60 includes various steps represented by blocks. It should be noted that at least some steps of the method 60 may be performed as an automated procedure by a system, such as the interactive system 10 of FIG. 1. Although the flow diagram illustrates the steps in a certain sequence, it should be understood that the steps may be performed in any suitable order and certain steps may be carried out simultaneously, where appropriate. Additionally, steps may be added to or omitted from the method 60. Further, some of all of the steps of the method 60 may be performed by the processor 34 of the control system 32 of FIG. 1.

In block 62, the method 60 may include receiving an indication of an actuation of an input mechanism on the portable device 16. Actuation of the input mechanism may indicate "firing" of a virtual projectile by the portable device 16. The location and orientation of the portable device 16, which may be continuously monitored by the UWB circuitry (e.g., UWB tags 24 and UWB anchors 44) and/or other suitable components, may be recorded at the time of "firing" of the virtual projectile. The location and orientation of the portable device 16 may be sent to the control system 32 for calculation/simulation of the trajectory of the virtual projectile.

In block 64, the method 60 may include determining a successful targeting of the first interactive element based on the location and orientation of the portable device 16 during the actuation of the input mechanism. Determining the successful targeting of the first interactive element may involve mapping the portable device 16 and the first interactive element onto the interactive space. Then, physics may be applied to calculate the trajectory of the virtual projectile fired by the portable device 16.

In block 66, the method 60 may include controlling the second interactive element to produce a response upon detection of a successful targeting of the first interactive element. Controlling the second interactive element to produce a response to the successful targeting may involve generating a signal at the control system 32 to change the second interactive element in some way that may be noticeable to the guest 12. For example, the second interactive element may be the interactive physical element 30, which may be controlled to stop, topple, jump, and/or shake in the interactive environment 14 in response to the interactive virtual element 28 being "hit" by a virtual projectile. More examples of responses of interactive elements to successful targeting by portable devices 16 is illustrated in FIG. 6 and FIG. 7.

Figure 6:
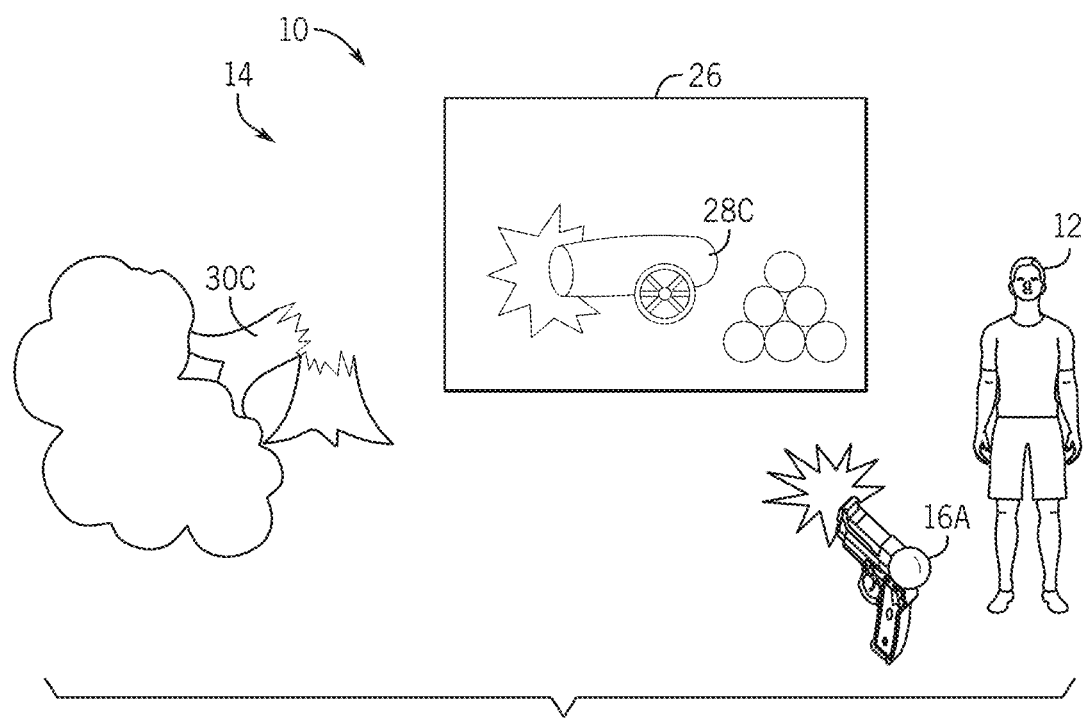
FIG. 6 is a schematic diagram of an interactive system where an activity of an interactive virtual element produces a response in an interactive physical element, in accordance with present embodiments.
Figure 7:
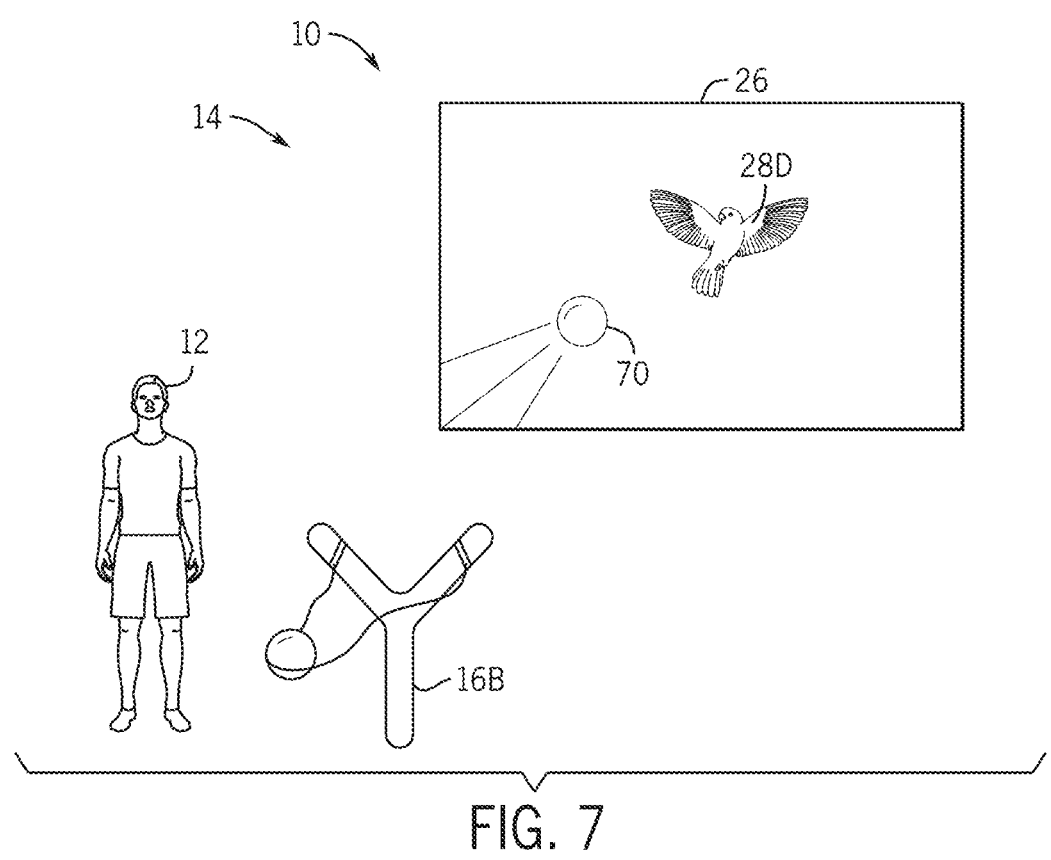
FIG. 7 is a schematic diagram of an interactive system where a virtual projectile is shown as an interactive virtual element, in accordance with present embodiments.

FIG. 6 is a schematic diagram of the interactive system 10 where the activity of the interactive virtual element 28 produces a response in the interactive physical element 30, in accordance with present embodiments. As illustrated, the interactive environment 14 includes a tree 30C that is the interactive physical element 30 and a cannon 28C that is the interactive virtual element 28. The cannon 28C may launch a virtual projectile (e.g., a cannon ball) aimed at the tree 30C and, in response, the tree 30C may break indicating a successful targeting by the cannon 28C. An image of the virtual projectile leaving the cannon 28C may appear on the display screen 26. However, the virtual projectile is not a prop or a physical object. Accordingly, the breaking of the tree 30C may imitate the presence of the virtual projectile in the physical, real-world space.

In an embodiment, the "firing" of the cannon 28C may be triggered by a successful targeting of the cannon 28C by virtual projectiles "fired" from the blaster 16A of the guest 12. In this way, a guest's interaction with an interactive virtual object may produce a response (e.g., breaking of the tree) in the physical, real-world space. In an embodiment, antagonizing a virtual character by "firing" virtual projectiles at it from the blaster 16A may cause the virtual character to "fire" back, producing a response in the interactive physical elements 30.

In an embodiment, to the control system 32 does not calculate or simulate the trajectory of the virtual projectile "fired" by the cannon 28C. Instead, the cannon 28C may be pre-programmed to "fire" at the tree 30C and the tree 30C may be pre-programmed/triggered to break upon "firing" of the cannon 28C. In an embodiment, the tree 30C is a static object, and its location may not be tracked with the UWB tags 24. Instead, its coordinates (e.g., location) and status (e.g., whole or broken) may be known to the interactive space before the interactive experiences begins. Similarly, the location of the cannon 28C may also be known in the interactive space as it is the interactive virtual element 28 with a pre-determined/pre-programed range of activity. It should be appreciated that there may be more than one interactive physical element 30 and/or at least one movable interactive physical element 30 that may be controlled to respond to being "hit" by the virtual projectile "fired" by the interactive virtual element 28. Additionally or alternatively, the interactive virtual element 28 may move (e.g., its position and/or its orientation; its aim) on the display screen 26 so that the virtual projectile "fired" by the interactive virtual element 28 may have different trajectories over time (e.g., and that are calculated by the control system 32 to determine a "hit" on the interactive physical element(s) 30).

FIG. 7 is a schematic diagram of the interactive system 10 where a response to the successful targeting of the interactive virtual element 28 is addition of points to the guest profile of the guest 12, in accordance with present embodiments. As illustrated, the interactive environment 14 includes a slingshot 16B that is the portable device 16 held by the guest 12. In addition, the interactive environment 14 includes a dynamic target 28D (e.g., a bird) that is the interactive virtual element 28 on the display screen 26. A virtual projectile 70 (e.g., a pebble) is shown on the display screen 26.

The trajectory of the virtual projectile 70 may be calculated/simulated based upon the location and/or the orientation of the slingshot 16B. In addition, the movement of the dynamic target 28D may be known due to being pre-programmed and/or mapped to the interactive space. Upon determination of a successful targeting of the dynamic target 28D by the virtual projectile 70, points may be added to the guest profile.

In an embodiment, the guest profile may be at least temporarily associated with a theme. For example, the guest profile may have a fire theme. In response to the guest profile having a fire theme, the representation of the virtual projectile 70 on the display screen 26 may be altered to look like a flaming object, for example. In addition, the special effects/feedback provided to the guest 12 may be influenced by the theme. For example, the light emitter (e.g., one of additional components) on the slingshot 16B may light up red upon launch of the projectile. Haptic technologies in the interactive environment 14 may provide additional feedback to a successful targeting of the target as heat flashes. In contrast, if the guest profile had an ice theme, the light emitter on the slingshot 16B and throughout the interactive environment 14 may light up blue and haptic technologies may provide cool air.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system, comprising:
a control system comprising one or more processors;
memory storing instructions that, when executed by the control system, cause the control system to:
receive data indicative of an orientation of a portable device;
determine a targeting of a physical portion of a hybrid interactive element by the portable device based on the orientation of the portable device;
identify a virtual interaction with the physical portion of the hybrid interactive element in response to the targeting of the physical portion of the hybrid interactive element by the portable device; and
adjust a virtual portion of the hybrid interactive element in response to the virtual interaction with the physical portion of the hybrid interactive element.

2. The interactive system of claim 1, wherein the instructions, when executed by the control system, cause the control system to:
adjust the physical portion of the hybrid interactive element in response to the virtual interaction with the physical portion of the hybrid interactive element.

3. The interactive system of claim 1, wherein the instructions, when executed by the control system, cause the control system to:
identify an additional virtual interaction with the virtual portion of the hybrid interactive element; and
adjust the physical portion of the hybrid interactive element in response to the additional virtual interaction with the virtual portion of the hybrid interactive element.

4. The interactive system of claim 3, wherein the instructions, when executed by the control system, cause the control system to:
adjust the virtual portion of the hybrid interactive element in response to the additional virtual interaction with the virtual portion of the hybrid interactive element.

5. The interactive system of claim 1, wherein the virtual portion of the hybrid interactive element is displayed on a display screen contained in an interactive real-world environment that also contains the physical portion of the hybrid interactive element.

6. The interactive system of claim 5, wherein the physical portion of the hybrid interactive element is positioned proximate to the display screen to provide an appearance of a connection between the physical portion of the hybrid interactive element and the virtual portion of the hybrid interactive element.

7. The interactive system of claim 1, wherein the instructions, when executed by the control system, cause the control system to:
display the virtual portion of the hybrid interactive element with an appearance that corresponds to at least part of the physical portion of the hybrid interactive element to adjust the virtual portion of the hybrid interactive element in response to the virtual interaction with the physical portion of the hybrid interactive element.

8. The interactive system of claim 7, wherein the display of the virtual portion of the hybrid interactive element with the appearance that corresponds to the at least part of the physical portion of the hybrid interactive element provides a visual effect of the at least part of the physical portion transferring to a virtual space depicted on a display screen.

9. The interactive system of claim 1, wherein the instructions, when executed by the control system, cause the control system to:
 instruct display of the virtual portion of the hybrid interactive element to adjust the virtual portion of the hybrid interactive element in response to the virtual interaction with the physical portion of the hybrid interactive element.

10. The interactive system of claim 1, wherein the virtual interaction comprises a virtual strike of the physical portion of the hybrid interactive element by a virtual projectile, and wherein the instructions, when executed by the control system, cause the control system to:
 identify the virtual strike by simulating a trajectory of the virtual projectile based on a location and the orientation of the portable device during an actuation of an input mechanism of the portable device.

11. The interactive system of claim 10, wherein the instructions, when executed by the control system, cause the control system to determine the location and the orientation of the portable device based on communication via ultra-wideband (UWB) circuitry.

12. The interactive system of claim 11, wherein the instructions, when executed by the control system, cause the control system to identify the actuation of the input mechanism via the communication via the UWB circuitry.

13. An interactive system, comprising:
 a control system comprising one or more processors;
 memory storing instructions that, when executed by the control system, cause the control system to:
  receive data indicative of an orientation of a portable device;
  determine a targeting of a first portion of a hybrid interactive element by the portable device based on the orientation of the portable device;
  identify a virtual interaction of a virtual projectile with the first portion of the hybrid interactive element in response to the targeting of the first portion of the hybrid interactive element by the portable device; and
  adjust a second portion of the hybrid interactive element in response to the virtual interaction with the first portion of the hybrid interactive element, wherein the first portion comprises a physical portion and the second portion comprises a virtual portion, or the first portion comprises the virtual portion and the second portion comprises the physical portion.

14. The interactive system of claim 13, wherein the virtual portion is displayed on a display screen within a real-world space that includes the physical portion disposed therein.

15. The interactive system of claim 13, wherein the instructions, when executed by the control system, cause the control system to identify the virtual interaction by simulating a trajectory of the virtual projectile based on a location and the orientation of the portable device during an actuation of an input mechanism of the portable device.

16. A method, comprising:
 receiving data indicative of an orientation of a portable device;
 determining a targeting of a first type of interactive element by the portable device based on the orientation of the portable device;
 identifying a virtual interaction with the first type of interactive element in response to the targeting of the first type of interactive element by the portable device; and
 in response to identifying the virtual interaction with the first type of interactive element, controlling a second type of interactive element to provide a visual effect, wherein the first type of interactive element comprises a physical element and the second type of interactive element comprises a virtual element, or the first type of interactive element comprises the virtual element and the second type of interactive element comprises the physical element.

17. The method of claim 16, wherein the first type of interactive element and the second type of interactive element form a hybrid interactive element with a portion in a real-world space and another portion in a virtual space.

18. The method of claim 16, wherein identifying the virtual interaction comprises identifying a virtual strike of the first type of interactive element with a virtual projectile.

19. The method of claim 18, comprising:
 receiving an indication of an actuation of an input mechanism on the portable device;
 determining a virtual trajectory of the virtual projectile based on a position of the portable device during the actuation of the input mechanism; and
 identifying the virtual strike of the first type of interactive element by the virtual projectile based on the virtual trajectory of the virtual projectile.

20. The method of claim 18, comprising instructing display of the virtual projectile on a display screen.

* * * * *